(No Model.)

C. CAMPBELL & J. COX.
CRATE.

No. 428,331. Patented May 20, 1890.

Witnesses:
Stephen Ballard
W. W. Allen

Inventors:
Charles Campbell
Jacob Cox
by their attorney
H. C. Walker

UNITED STATES PATENT OFFICE.

CHARLES CAMPBELL AND JACOB COX, OF WINCHESTER, INDIANA.

CRATE.

SPECIFICATION forming part of Letters Patent No. 428,331, dated May 20, 1890.

Application filed March 13, 1890. Serial No. 343,802. (No model.)

*To all whom it may concern:*

Be it known that we, CHARLES CAMPBELL and JACOB COX, both citizens of the United States, residing at Winchester, in the county of Randolph and State of Indiana, have invented a new and useful Improvement in Berry and Fruit Crates, of which the following is a specification.

Our invention relates to improvements in berry and fruit crates; and the object of our present invention is to provide an inexpensive, convenient, and easily-constructed crate which will permit of handling and shipping any desired number of trays of berries or fruit and the thorough ventilation of the fruit without any risk of having the fruit jammed or bruised or the baskets broken, and which can be easily and quickly taken apart and the fruit thoroughly inspected and examined.

A sheet of drawings accompanies this specification as a part thereof.

Figure 1:
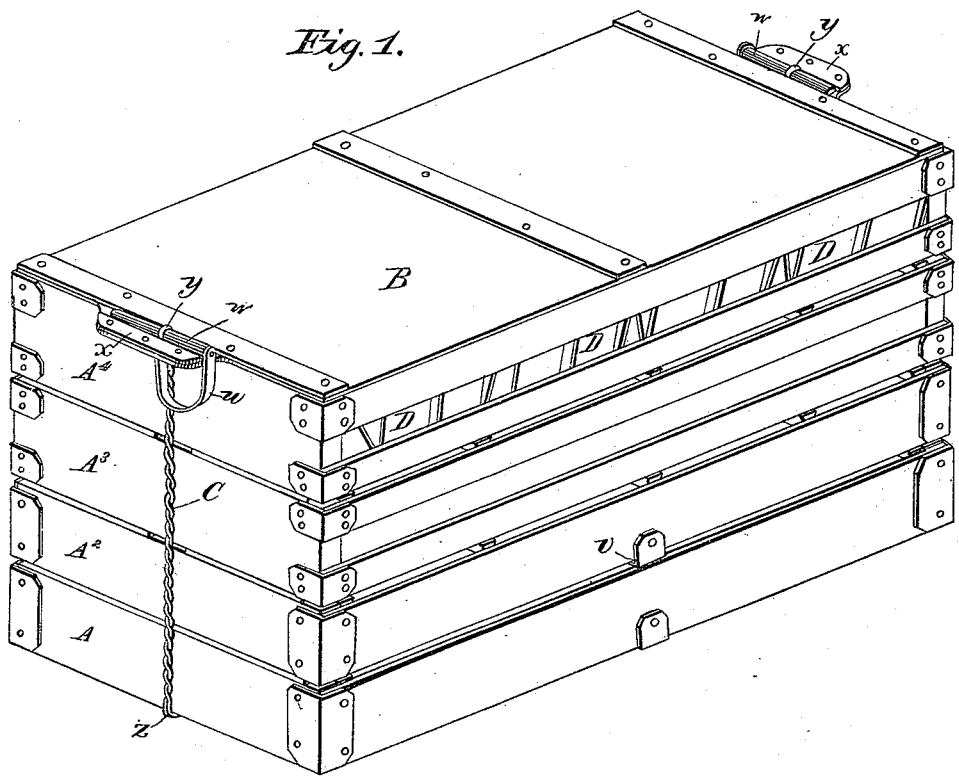
Figure 2:
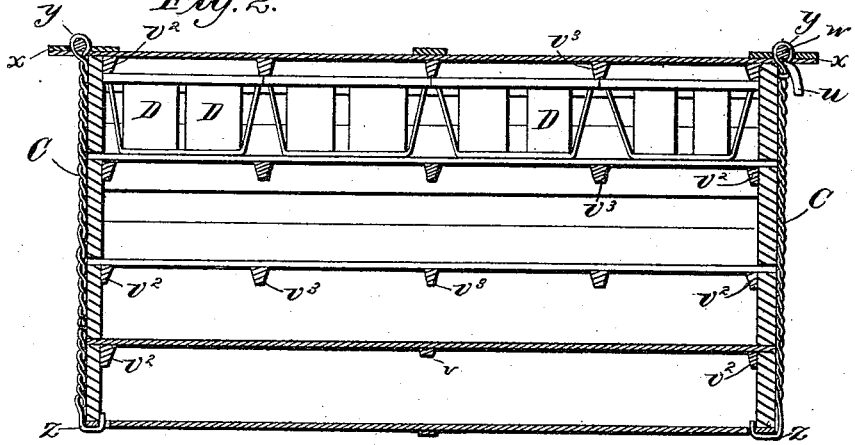

Figure 1 is a perspective view of the entire crate. Fig. 2 is a vertical longitudinal section of the same.

Our crate is composed of any required number of berry or fruit trays, as A $A^2$ $A^3$ $A^4$, of equal longitudinal area, placed one upon the other, covered with a lid B and secured and firmly held in position by means of rods C at the respective ends of the crate, the rods C, having hooks $z$, which engage with the end pieces of the bottom tray A, and loops $y$, which pass through handles $x$, that project from the ends of the lid B and are secured by fastening-pins $w$, passing through the loops $y$ above the handles $x$. The bottom tray A is constructed of solid end pieces, solid sides a trifle lower at the top than are the end pieces to permit of ventilation, and a solid bottom having a hole at each end to receive the hooks on the lower ends of the rods. The second tray $A^2$ is constructed like the bottom tray with solid ends, sides, and bottom, but has in addition three cleats $v$ $v^2$ across the bottom— one at the center and one near each end—the central cleat $v$ being adapted to rest on the upper edges of the sides of the lower tray as spacing-cleats, while the end cleats $v^2$ come in contact with the sides and ends of the lower tray to prevent longitudinal or lateral displacement of the tray to which they are affixed. The third and fourth trays $A^3$ $A^4$ are each constructed of solid end pieces and slatted sides and bottoms, the latter provided with cleats $v^2$, as above, and intermediate cleats $v^3$, designed to come in contact with the tops of boxes or baskets in the tray below to keep them steady. The fourth or top tray is covered with the lid B, which has cleats $v^2$ $v^3$ on its under side similar to those on the third and fourth trays, and a handle or projection $x$ at each end having slots for receiving the loops on the upper ends of the rods C, as above described.

All of the cleats serve to strengthen the bottoms, and when small boxes or baskets D are used the cleats $v^2$, as well as the cleats $v^3$, serve to keep them in place by resting upon portions of their upper edges.

It is obvious that any ordinary construction of tray may be used when provided with the cleats $v^2$, above described, or equivalent means for preventing the longitudinal and lateral displacement of the trays, and that the ends, sides, and bottoms of the trays may be made either solid or slatted. The trays composing the crate shown in the accompanying drawings are of both kinds; but the trays may all be of either pattern. The two lower or solid trays can be used for carrying the fruit either in bulk or in baskets. The two upper or slatted trays are especially fitted for carrying the fruit in baskets.

The rods C may be made of any suitable material; but they are preferably of No. 9 wire, so doubled, twisted, and bent as to form a wire rod with the loop $y$ at one end and the hook $z$ at the other end.

The crate is put together and secured for handling and shipping by placing the trays one upon another, covering them with the lid, and fastening the whole together by putting at each end of the crate one of the rods C, with the hooks $z$ coupled to the end pieces of the lower tray and the loops $y$ passed through the slots in the handles $x$, and fastening the rods by inserting the fastening-pins $w$, which are secured to the rods by straps $u$ to prevent their being lost or mislaid when not in use. Small padlocks may be substituted for the fastening-pins $w$, and other like modifications will suggest themselves to those skilled in the art.

Having thus fully described our invention, what we claim, and desire to secure by Letters Patent, is—

1. The combination of a vertical series of fruit-trays, a lid fitted to the uppermost tray and having slotted end handles, a pair of rods at the respective ends having hooks interlocked with the lowermost tray and loops passing through said handles, and fastening devices applied to said loops and engaging the handles, substantially as described.

2. The combination of a vertical series of fruit-trays, a lid fitted to the uppermost tray and having slotted end handles, a pair of rods at the respective ends having hooks interlocked with the lowermost tray and loops passing through said handles, and fastening devices applied to said loops, the bottom tray having holes to receive said hooks and the superposed trays and lid having cleats at bottom to prevent longitudinal and lateral displacement, substantially as described.

3. The combination of a vertical series of fruit-trays containing baskets D, a lid fitted to the uppermost tray and having slotted end handles, a pair of rods at the respective ends having hooks interlocked with the lowermost tray and loops passing through said handles, and fastening devices applied to said loops, the bottom tray having holes to receive said hooks and the superposed trays and lid having at bottom cleats $v^2$ to prevent longitudinal and lateral displacement, and cleats $v^3$, which with cleats $v^2$ serve to keep the baskets in place, substantially as described.

CHARLES CAMPBELL.
JACOB COX.

Witnesses:
A. M. HOSTELLER,
N. BALLARD.